United States Patent
Gurney et al.

(10) Patent No.: US 8,208,391 B2
(45) Date of Patent: Jun. 26, 2012

(54) METHOD AND APPARATUS FOR OPERATING A NODE WITHIN A MOBILE AD HOC COGNITIVE RADIO NETWORK

(75) Inventors: David P. Gurney, Carpentersville, IL (US); Ramy S. Ayoub, Arlington Heights, IL (US); John M. Belcea, West Melbourne, FL (US); Jeffrey D. Bonta, Arlington Heights, IL (US); Mark R. Braun, Elgin, IL (US); Robert J. Corke, Glen Ellyn, IL (US); Mark D. Hansen, Buffalo Grove, IL (US); S. David Silk, Barrington, IL (US); Christopher G. Ware, Heathcote (AU)

(73) Assignee: Motorola Solutions, Inc., Schaumburg, IL (US)

( * ) Notice: Subject to any disclaimer, the term of this patent is extended or adjusted under 35 U.S.C. 154(b) by 1011 days.

(21) Appl. No.: 11/948,100

(22) Filed: Nov. 30, 2007

(65) Prior Publication Data

US 2009/0141662 A1    Jun. 4, 2009

(51) Int. Cl.
  *H04L 12/28* (2006.01)
  *G08C 17/00* (2006.01)
  *H04J 3/18* (2006.01)
  *H03C 1/62* (2006.01)

(52) U.S. Cl. ...... 370/252; 370/311; 370/477; 455/115.1

(58) Field of Classification Search .................. 370/230, 370/235, 252, 277–278, 282, 31, 338, 465, 370/477; 709/220–226; 455/425, 426.3, 455/41.2, 522, 67.13, 115.1, 115.3–115.4, 455/127.1, 343.1–343.4, 574; 714/47

See application file for complete search history.

(56) References Cited

U.S. PATENT DOCUMENTS

| | | | |
|---|---|---|---|
| 6,331,971 B1* | 12/2001 | Raith | 370/311 |
| 2001/0031626 A1 | 10/2001 | Lindskog et al. | |
| 2002/0113692 A1 | 8/2002 | Normann et al. | |
| 2003/0152041 A1* | 8/2003 | Herrmann et al. | 370/310 |
| 2004/0230638 A1* | 11/2004 | Balachandran et al. | 709/200 |

(Continued)

FOREIGN PATENT DOCUMENTS

| | | |
|---|---|---|
| EP | 1855493 A2 | 11/2007 |
| WO | 02078229 A1 | 10/2002 |
| WO | 2005064863 A1 | 7/2005 |

OTHER PUBLICATIONS

PCT International Search Report and Written Opinion Application No. PCT/US2008/083292 Dated May 6, 2009—15 Pages.

(Continued)

*Primary Examiner* — Kwang B Yao
*Assistant Examiner* — Redentor Pasia
(74) *Attorney, Agent, or Firm* — Randi L. Karpinia

(57) ABSTRACT

A method and apparatus for operation of a node within a mobile ad hoc cognitive radio network is provided. The method includes sensing at least one assigned communications channel. Sensing at least one assigned communications channel includes measuring a value of at least one parameter corresponding to the communications channel. The method further includes comparing the measured value of the at least one parameter with a set of stored values of the at least one parameter to determine a change in the measured values. Finally a sleep mode of the node is activated for a time period, wherein the time period is determined using the change in the measured values.

23 Claims, 4 Drawing Sheets

U.S. PATENT DOCUMENTS

| | | | | |
|---|---|---|---|---|
| 2005/0221869 A1* | 10/2005 | Liu et al. | | 455/574 |
| 2006/0056370 A1* | 3/2006 | Hancock et al. | | 370/338 |
| 2006/0229520 A1 | 10/2006 | Yamashita et al. | | |
| 2007/0037610 A1* | 2/2007 | Logan | | 455/574 |
| 2007/0099678 A1* | 5/2007 | Kim et al. | | 455/574 |
| 2007/0264963 A1* | 11/2007 | Srinivasan et al. | | 455/343.2 |

OTHER PUBLICATIONS

Jelena Mišić et al.: "Queueing Analysis of Sleep Management in an 802.15.4 Beacon Enabled Pan"—10 Pages.

Jelena Mišić, Shairmina Shafi and Vojislav B. Mišić (University of Manitoba), 'Cross-Layer Activity Management in an 802.15.4 Sensor Network', IEEE Communications Magazine, Jan. 2006, pp. 131-136.

Martinez, K. et al., Environmental Sensor Networks, Computer vol. 37, Issue 8, IEEE, 2004, pp. 50-56.

Rothermel, Kurt et al, Consistent Update Diffusion in Mobile Ad Hoc Networks, Institute of Parallel and Distributed High Performance Systems (IPVS), Department of Computer Science, University of Stuttgart, Technical Report 2002-04, Jul. 2002, 23 pages.

* cited by examiner

METHOD AND APPARATUS FOR OPERATING A NODE WITHIN A MOBILE AD HOC COGNITIVE RADIO NETWORK

FIELD OF THE INVENTION

The present invention generally relates to mobile ad hoc cognitive radio networks. More specifically, the present invention relates to methods of operating a node within a mobile ad hoc cognitive radio network.

BACKGROUND

A mobile ad hoc cognitive radio network is an ad hoc network implementing cognitive radio technology.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of ad hoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through conversation with its neighboring nodes. The routing information can also be periodically broadcast in the network to reflect the current network topology. Alternatively, to reduce the amount of information transmitted for maintaining accurate routing information, the network nodes may exchange routing information only when it is needed.

Cognitive radio technology includes the capability of mobile nodes to alter transmission parameters based on knowledge of its environment. For example, a cognitive radio network can be a network of mobile communication nodes (hereinafter referred as nodes) in which a mobile communication node changes its transmission or reception parameters to communicate efficiently in order to avoid interference with incumbent users. This alteration of parameters is based on active monitoring of several factors in the external and internal radio environment, such as radio frequency spectrum, user behavior and network state.

The nodes typically need to keep sensing the network so as to monitor presence of any high priority spectrum occupant to assure unimpeded spectrum access to the high priority spectrum occupant. Further, the nodes may need to keep sensing the network to make sure that quality of service on the network is not degraded. The network may choose to abandon a spectrum if it is sensed that the quality of network is degraded, such as, an unfavorable change in noise/interference floor, allowed transmit power, or propagation conditions (if either the network or the environment are in motion), or identification of another channel that offers increased or more reliable throughput.

There are several existing methods to save power in a mobile node. One such method provides for some nodes to go to sleep when there is a particular quantity of nodes in the network. Each active node makes measurement and transmits them. A node sleeps for a random amount of time. When the node wakes up, it checks a node report buffer. If the node report buffer is empty, the node immediately goes back to sleep. If the node report buffer has content, the radio of the node wakes up transceiver of the node and tries to transmit the measurements. Here, adaptive sleeping probabilities are calculated depending on whether nodes are dying off. Also, old measurements are pushed out of the node report buffer and not transmitted.

In another method for saving power in a mobile node a single repository for node powering status (battery or line powered) and Dynamic Frequency Selection (DFS) measurements is provided. DFS measurements are altered based on node power supply condition. Here, if some battery powered nodes are excluded from making measurements, then the nodes with reserve power are assigned more measurements. A node determines the duration of its sleep cycle based on its power status.

In the existing systems, nodes sense and transmit results regardless of the change from previous sensor results. This results in inappropriate utilization of communication resources.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
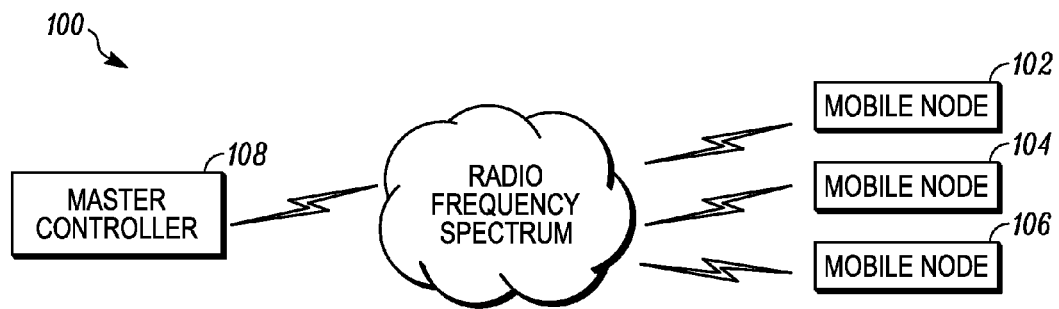
FIG. 1 is a block diagram illustrating a mobile ad hoc cognitive network in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to operating a node within a mobile ad hoc cognitive radio network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of mobile nodes in a mobile ad hoc cognitive radio network described herein. The non-processor circuits may include, but are not limited to, a radio receiver, a radio transmitter, signal drivers, clock circuits, power source circuits, and user input devices. As such, these functions may be interpreted as steps of a method to operate a node within a mobile ad hoc cognitive radio network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Any embodiment described herein is not necessarily to be construed as preferred or advantageous over other embodiments. All of the embodiments described in this Detailed Description are illustrative and are described to enable persons skilled in the art to make or use the invention and not to limit the scope of the invention which is defined by the claims.

FIG. 1 is a block diagram illustrating a mobile ad hoc cognitive network 100 in which various embodiments of the invention may function. The mobile ad hoc cognitive network 100, for example, can comprise an ad hoc wireless communication network 100 such as a mesh enabled architecture (MEA) network or an 802.11 network (i.e. 802.11a, 802.11b, 802.11g, 802.11n or 802.11s). It will be appreciated by those of ordinary skill in the art that the mobile ad hoc cognitive network 100 in accordance with the present invention can alternatively comprise any packetized communication network where packets are forwarded across multiple wireless hops. For example, the mobile ad hoc cognitive network 100 can be a network utilizing multiple access schemes such as OFDMA (orthogonal frequency division multiple access), TDMA (time division multiple access), FDMA (Frequency Division Multiple Access), or CSMA (Carrier Sense Multiple Access). Additionally, each wireless hop of the mobile ad hoc cognitive network 100 may either employ the same multiple access scheme as the other hops, or a unique multiple access scheme per hop, or alternatively a different access scheme can be used in each direction of a hop.

The mobile ad hoc cognitive network 100 includes a plurality of mobile nodes, for example, mobile node 102, mobile node 104 and mobile node 106. Examples of a mobile node may include, but are not limited to, a cellular phone and a Personal Digital Assistant (PDA). As can be appreciated by one skilled in the art, the nodes 102, 104, and 106 are capable of communicating with each other directly or indirectly. When communicating indirectly, one or more other nodes can operate as a router or routers for forwarding or relaying packets being sent between nodes.

The mobile ad hoc cognitive network 100 may also include a master controller 108. Each mobile node uses a radio frequency spectrum to initiate communication with other mobile nodes and the master controller 108. The radio frequency spectrum includes one or more channels.

Figure 2:
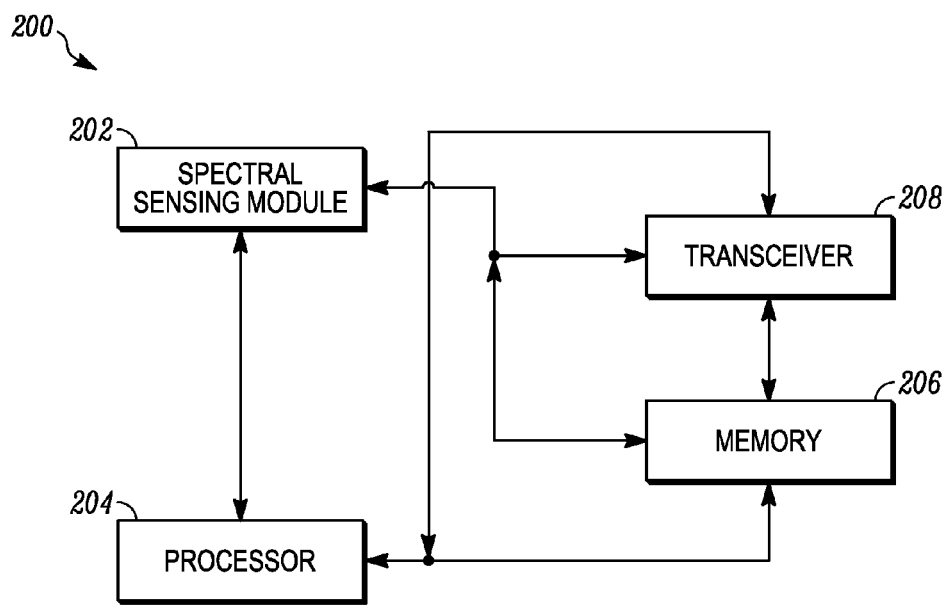
FIG. 2 is a block diagram illustrating various components of a mobile node, in accordance with an embodiment of the invention.

FIG. 2 is a block diagram illustrating various components of a mobile node 200. The mobile node 200, for example, can be the mobile node 102, 104, and/or 106 of FIG. 1 in accordance with an embodiment of the invention. The mobile node 200 includes a spectral sensing module 202, a processor 204, a memory 206, and a transceiver 208.

Although not shown, the mobile node 200 also can include an antenna switch, duplexer, circulator, or other highly isolative means (not shown) for intermittently providing information packets from the transceiver 208 to an antenna (not shown) and from an antenna (not shown) to the transceiver 208. The mobile node 200, for example, can be an integrated unit containing at least all the elements depicted in FIG. 2, as well as any other elements necessary for the mobile node 200 to perform its particular functions. Alternatively, the mobile node 200 can comprise a collection of appropriately interconnected units or devices, wherein such units or devices perform functions that are equivalent to the functions performed by the elements of the mobile node 200. For example, the mobile node 200 may comprise a laptop computer coupled to a wireless local area network (WLAN) card.

The processor 204 includes one or more microprocessors, microcontrollers, DSPs (digital signal processors), state machines, logic circuitry, or any other device or devices that process information based on operational or programming instructions. Such operational or programming instructions are stored in the memory 206. The memory 206 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. One of ordinary skill in the art will recognize that when the processor 204 has one or more of its functions performed by a state machine or logic circuitry, the memory 206 containing the corresponding operational instructions may be embedded within the state machine or logic circuitry. The operations performed by the processor 204 and the rest of the mobile node 200 are described in detail below.

The processor 204, in one embodiment, includes means for performing geolocation database calculations. Geolocation database calculations generally involve computing expected (i.e., predicted) incumbent signal strengths based on the location of the mobile node 200 and knowledge of incumbent transmitters (e.g., their location, transmission power, antenna characteristics, etc.). Alternatively, results of geolocation database calculations can be provided to the mobile node 200 (e.g., wirelessly) by another node in the network (e.g., the master controller 108). Results of geolocation database calculations can include geolocation database predicted values of incumbent signal strengths per unit location.

The memory 206 as illustrated is coupled with the spectral sensing module 202. The spectral sensing module 202 is generally utilized to sense incumbent signals (either licensed or unlicensed).

The spectral sensing module 202 senses one or more assigned communication channels. The spectral sensing module 202 also measures a value of one or more parameters corresponding to one or more communications channels sensed. The processor 204 is configured to compare the measured values of one or more parameters corresponding to one or more communications channels with a set of stored values of the one or more parameters to determine a change in the measured values. The set of stored values can be based on prior channel measurements. The set of stored values can also be based on the results of geolocation database calculations. In an embodiment, the processor 204 operates to activate a sleep mode of the mobile node 200 for a time period. In an embodiment, the time period is related to the required sensing rate. The processor 204 determines the time period using the change in the measured values. Alternatively, the processor 204 determines the time period using the difference between the measured value and geolocation database predicted values. In another embodiment, the processor 204 adds the measured values to the set of stored values. The processor 204 tracks a historical rate of change using the set of stored values. The historical rate of change includes the rate of change in the stored values.

The memory 206 stores the measured values of one or more parameters corresponding to one or more communications channels. Alternatively, the memory 206 also stores the results of the geolocation database calculations. The measured values of one or more parameters are compared to either the stored values of the one or more parameters or the results of the geolocation database calculations to identify the difference in values. When the difference in values is more than a pre-determined threshold, the transceiver 208 initiates a communication with one or more mobile nodes of the plurality of mobile nodes in accordance with some embodiments of the invention. The transceiver 208 also reports results to the master controller 108 in accordance with an embodiment of the present invention. The Master controller 108 then uses the difference in values to alter the time period of the sleep mode. In an alternate embodiment, the time period of sleep mode is determined locally by the processor 204 as will be discussed hereinafter in further detail with regards to FIGS. 4 and 5. The pre-determined threshold, in an embodiment, is a pre-defined value for which the mobile ad hoc cognitive network 100 changes the operating channel.

The transceiver 208 enables the mobile node 200 to communicate information packets to and acquire information packets from the other nodes. In this regard, the transceiver 208 includes conventional circuitry to enable digital or analog transmissions over a wireless communication channel. The transceiver 208 operates over an ad hoc networking air interface (e.g., Bluetooth, 802.11 networking, 802.16 or 802.16e WiMAX (Worldwide Interoperability for Microwave Access), and the like).

The implementation of the transceiver 208 depends on the implementation of the mobile node 200. For example, the transceiver 208 can be implemented as an appropriate wireless modem, or as conventional transmitting and receiving components of two-way wireless communication devices. In the event that the transceiver 208 is implemented as a wireless modem, the modem can be internal to the mobile node 200 or insertable into the mobile node 200 (e.g., embodied in a wireless radio frequency (RF) modem implemented on a Personal Computer Memory Card International Association (PCMCIA) card). For a wireless communication device, the transceiver 208 can be implemented as part of the wireless device hardware and software architecture in accordance with known techniques. Most, if not all, of the functions of the transceiver 208 can be implemented in a processor, such as the processor 204. However, the processor 204 and the transceiver 208 have been artificially partitioned herein to facilitate a better understanding.

Figure 3:
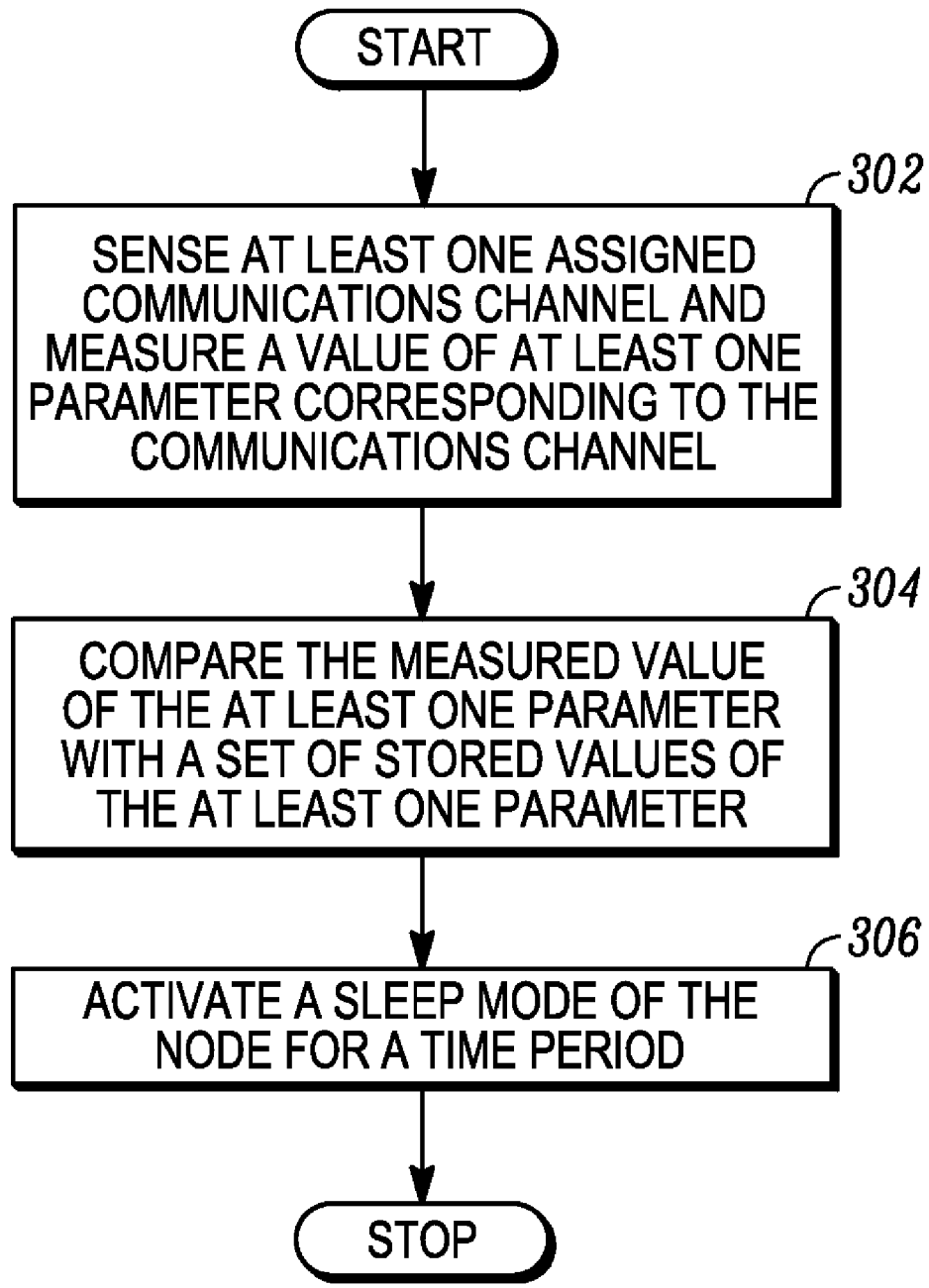
FIG. 3 is a flow chart illustrating a method of operation of a mobile node within a mobile ad hoc cognitive radio network, in accordance with an embodiment of the invention.

FIG. 3 is a flow chart illustrating a method of operation of the mobile node 200 within the mobile ad hoc cognitive radio network 100, in accordance with an embodiment of the invention. At step 302, the spectral sensing module 202 senses one or more assigned communication channels. In an embodiment, an assigned communication channel is partially sensed for partially measuring values of one or more parameters. Thereafter, the assigned communication channel is completely sensed depending on one or more of the pre-stored values and the partially measured values of one or more parameters. The spectral sensing module 202 also measures a value of one or more parameters corresponding to one or more communications channels sensed. Examples of a parameter include, but are not limited to a noise or interference floor, one or more incumbent signal strength levels (e.g., Received Signal Strength Indication (RSSI), Signal to Noise Ratio (SNR), Carrier to Interference Ratio (C/I)), a quality of service (QoS) level, a network performance, and a neighboring node sensing metric. The measured values of the one or more parameters are also generally stored in the memory 206. In an embodiment, the memory 206 also stores a historical set of measurements for each stored value. At step 304, the processor 204 compares the measured value of one or more parameters with the set of stored values of one or more parameters or the results of the geolocation database calculations to determine a change in the measured values. Thereafter, at step 306 the processor 204 activates a sleep mode of the mobile node 200 for a time period. The time duration of the sleep mode is determined using the change in the measured values.

At step 306, the processor 206 activates the sleep mode of the mobile node 200 for a time period depending on the historical measurements of the value of the one or more parameters corresponding to the communications channel. In an embodiment, the time period for which the sleep mode is activated depends on the rate of change of the measured values.

Figure 4:
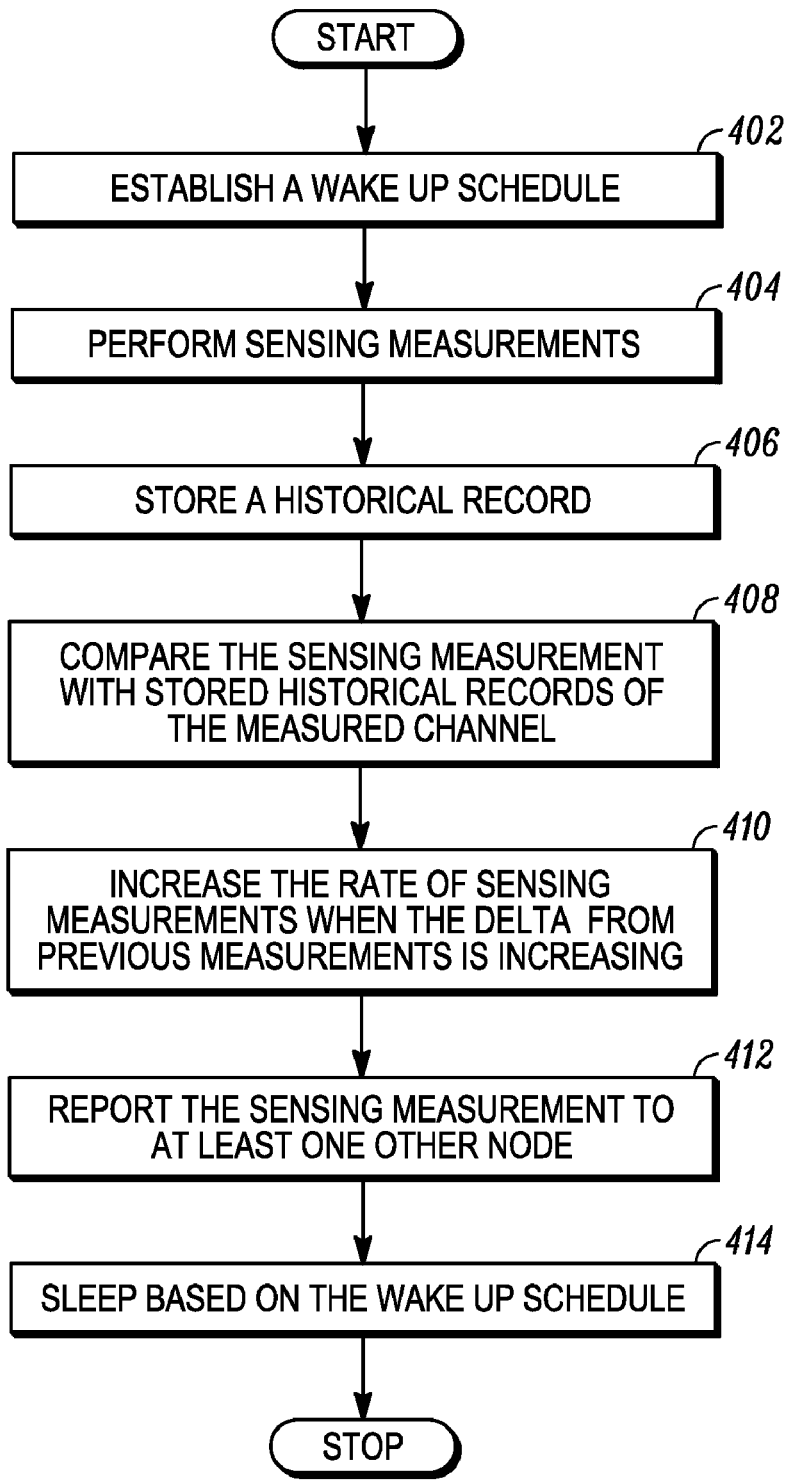
FIG. 4 is a flow chart illustrating a method of operation of a mobile node within a mobile ad hoc cognitive radio network, in accordance with an alternative embodiment of the invention.

FIG. 4 is a flow chart illustrating a method of operation of the mobile node 102 within the mobile ad hoc cognitive radio network 100, in accordance with an alternative embodiment of the invention. At step 402, a wake up schedule is established. In an embodiment, the wake up schedule is established by the processor 204 based on a random start time and a node density of the mobile cognitive radio network 100. At step 404, the spectral sensing module 202 senses one or more assigned communication channels when the mobile node 200 awakens based on the wake up schedule. In an embodiment, an assigned communication channel is partially sensed for partially measuring values of one or more parameters. Thereafter, the assigned communication channel is completely sensed depending on one or more of the pre-stored values and the partially measured values of one or more parameters. The spectral sensing module 202 also measures a value of one or more parameters corresponding to one or more communications channels sensed. Examples of a parameter include, but are not limit to a noise or interference floor, one or more incumbent signal strength levels (e.g., RSSI, SNR, C/I), one or more interference signal strength levels, a quality of service level, a network performance, and a neighboring node sensing metric.

At step 406, the measured values or the geolocation database predicted values of the one or more parameters are stored in the memory 206 as previously described herein in conjunction with FIG. 3. In an embodiment, the memory 206 also stores a historical record including a time stamp with one or more of the sensing measurements for each of the communication channels measured. At step 408, the processor 204 compares the measured value of one or more parameters with the set of stored values of one or more parameters to determine a change in the measured values. At step 410, the rate of sensing measurements is increased when the change from previous measurements is (e.g., unexpectedly) increasing. For example, in one embodiment, the rate of sensing is increased when the measured values differ significantly (e.g., beyond a threshold value) from the geolocation database predicted values. The processor 204 analyses the stored values of the one or more parameters to determine the rate of change of the measured values. When the rate of sensing is increased in Step 410, the wake up schedule is also updated. At step 412, the sensed measurements are reported to one or more other nodes within the network 100 when the measurement exceeds a threshold value above the previous measurement or the geolocation database predicted values. In an embodiment, the threshold value is a pre-determined value. The threshold value may also be determined dynamically in the system (e.g., either by the mobile node 102, or by the master controller 108) depending on the desired sensitivity level to measured parameter changes. Note that this sensitivity level in general determines average network sleep periods, scanning rates and reporting rates. For example, when numerous suitable communications channels are currently available for the network, the sensitivity level to measured parameter changes may be dynamically decreased, generally resulting in longer sleep periods, fewer sensing scans and less network control communication. At step 414, the mobile node 200 sleeps based on the wake up schedule. In an embodiment, the wake up schedule depends on the rate of change of the measured values.

Figure 5:
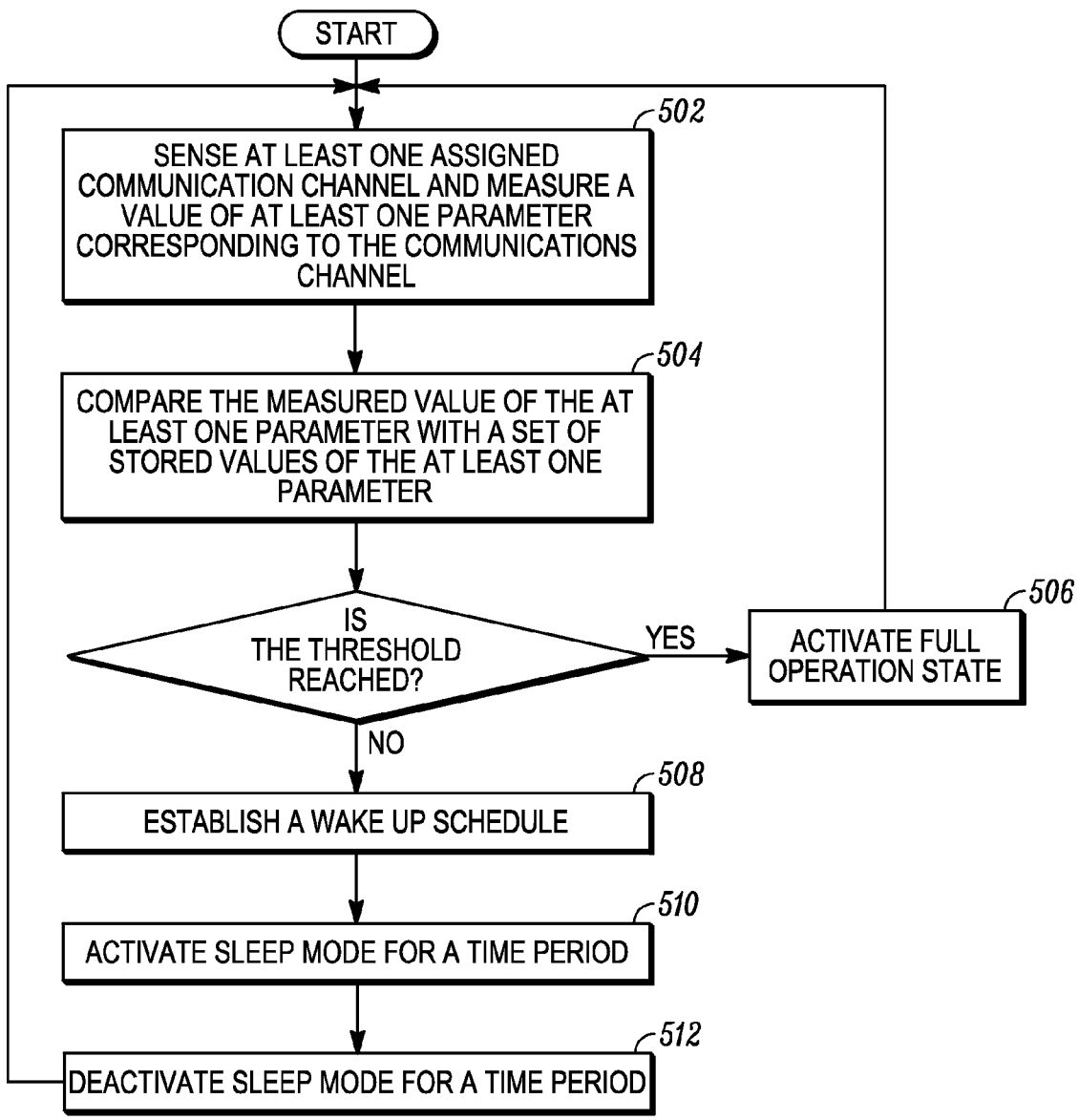
FIG. 5 is a flow chart illustrating a method of operation of a node within a mobile ad hoc cognitive radio network, in accordance with an embodiment of the invention.

FIG. 5 is a flow chart illustrating a method of operation the mobile node 200 within the mobile ad hoc cognitive radio network 100, in accordance with another embodiment of the invention. At step 502, one or more assigned communications channels are sensed by the spectral sensing module 202.

The spectral sensing module 202 also measures a value of one or more parameters corresponding to the communications channel. The measured values are stored in the memory 206 in one embodiment. In another embodiment, the predicted values from geolocation database calculations are stored in the memory 206. At step 504, the processor 204 compares the measured value of the at least one parameters with a set of stored values of the at least one parameters to determine a change in the measured values. When a predetermined threshold is reached, then at step 506, the processor 204 activates the full operation mode of the mobile node 200. In an embodiment, the predetermined threshold is the minimum difference from the previously measured value at which the transceiver 208 of the mobile node 200 is activated. In the full operation mode, the transceiver 208 of the mobile node 200 transmits the measured value of the at least one parameters to neighbor nodes in the network 100.

Alternatively, when a predetermined threshold is not reached, then at step 508, a wake up schedule is established. The wake-up schedule identifies the time period for the sleep mode of the mobile node 102. In an embodiment, the wake up schedule is established by the processor 204, based on a random start time and a node density of the mobile cognitive radio network 100. At step 510, the processor 204 activates a sleep mode of the mobile node 200 for a time period. The time period of the sleep mode is, for example, determined using the change in the measured values. In accordance with various embodiments of the present invention, the time period comprises an integer multiple of a base sleep duration.

Since the mobile nodes need to sense during system quiet periods to avoid self interference, the time period of the sleep mode should be an integer multiple of a base sleep durations long. In this way, regardless of how many base cycles a mobile node sleeps, the mobile node awakes for sensing during a scheduled quiet period. This will also provide a time-base for reporting measurements to neighboring nodes. The reporting time can be several report durations long to allow reports to propagate through multiple tiers, or single-report durations can be used and reports can be forwarded to the next tier at the next reporting cycle. Reports of scanning results may also be dispersed (e.g., randomized or assigned based on decimated MAC addresses) to relieve the stress on the network (i.e., to avoid bandwidth bottlenecks when several nodes attempt to report their scanning results at once). The random sleep keeps a short-term variable but long-term steady flow of sensor results coming in.

In an alternate embodiment, the time period is determined using one or more out of band information. In accordance with various embodiments of the invention, the sleeping mode further includes at least one of a power conservation state comprising a no-communication state and a sensing only state. In the no-communication state, the spectral sensing module 202 and the transceiver 208 of the mobile node 200 are deactivated. However, in the sensing only state, the spectral sensing module 202 is active where as the transceiver 208 is inactive. In the power conservation state the mobile node 200 only senses at least one parameter corresponding to the communications channel.

At step 512, the processor 204 deactivates the sleep mode after the time period. Once the sleep mode is deactivated, the sensing step 502, comparing step 504, and activating step 508 are performed again in accordance with an embodiment of the invention.

In some embodiments of the present invention, the processor 204 adds the measured values to the historical measurements that are stored in the memory 206 along with a time stamp. Further the processor 204 keeps tracking rate of change of the measured values using the historical measurements. Also, the processor 204 establishes a wake-up schedule for the mobile node 200. The processor 204 changes the wake-up schedule based on the change. The wake-up schedule identifies the time period for the sleep mode.

Thus, sleep periods of the mobile node 200 are efficiently controlled. The battery life of the mobile node 200 is improved while the mobile node 200 still monitors the spectrum ensuring compliance with regulations. The battery life of the mobile node 200 is improved by reducing the number of transmissions of the values of the spectrum parameters. Also the length of time the transceiver 208 is active is also reduced. By reducing the length of time that the transceiver 208 is active, the mobile node 200, while monitoring for sensor measurement traffic, can quickly go back to sleep mode in the absence of any traffic, thus increasing the battery life.

Further, the mobile ad hoc cognitive network 100 effectively senses the presence of a higher priority spectrum occupant. Also, the mobile ad hoc cognitive network 100 effectively senses unfavorable conditions in the radio frequency spectrum and changes the operating channel efficiently.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of operation of a node within a mobile ad hoc cognitive radio network, the method comprising:
    sensing at least one communications channel including measuring a value of at least one parameter corresponding to the communications channel;
    comparing the measured value of the at least one parameter with a set of stored values of the at least one parameter based on a geolocation database calculations to determine a of change in the measured values, wherein the geolocation database calculations comprise computing geolocation database predicted values of incumbent signal strengths per unit location; and
    activating a sleep mode of the node for a time period, wherein the time period is determined using the change in the measured values.

2. A method as claimed in claim 1, the method further comprising:
    adding a result of the geolocation database calculations to the set of stored values;
    tracking a historical rate of change using the set of stored values; and
    transmitting the measured value to one or more neighboring nodes within the mobile ad hoc cognitive radio network in response to the historical rate of change exceeding a threshold.

3. A method as claimed in claim 2, wherein:
    the node operates in a no-communication state during the sleep mode;
    the node operates in a sensing only state during the sensing step; and
    the node operates in a full operation state during the transmitting step.

4. A method as claimed in claim 3, wherein the sensing only state comprises a semi-sleep mode of the node.

5. A method as claimed in claim 3, wherein the sensing only state comprises a low-power mode of the node.

6. A method as claimed in claim 3, wherein the full operation state comprises an active transceiver mode of the node.

7. The method as claimed in claim 2, wherein the threshold level is dynamically determined.

8. A method as claimed in claim 1, further comprising:
    transmitting the measured value to one or more neighboring nodes in response to the change comprising at least a threshold level.

9. A method as claimed in claim 8, wherein:
    the node operates in a no-communication state during the sleep mode,
    the node operates in a sensing only state during the sensing step, and
    the node operates in a full operation state during the transmitting step.

10. A method as claimed in claim 1, further comprising:
    storing a result of the geolocation database calculations of the at least one parameter along with a time stamp.

11. A method as claimed in claim 1, further comprising:
    deactivating the sleep mode after the time period.

12. A method as claimed in claim 11, further comprising:
    establishing a wake-up schedule for the node prior to the sensing step;
    changing the wake-up schedule based on the change in the measured values, wherein the wake-up schedule identifies the time period for the sleep mode.

13. A method as claimed in claim 11, further comprising:
    performing the sensing, comparing, and activating steps again after the deactivating step.

14. A method as claimed in claim 11, wherein at least one other node operates on the communication channel, the method further comprising:
    assigning the at least one other node to transmit information corresponding to the communication channel to the node after the deactivating step.

15. A method as claimed in claim 1, wherein the sensing step comprises:
    partially sensing the communication channel for partially measuring value of the at least one parameter; and
    completely sensing the communication channel depending on at least one of the set of stored values and the partially measured value of the at least one parameter.

16. A method as claimed in claim 1, wherein the time period comprises an integer multiple of a base sleep duration.

17. A method as claimed in claim 1, wherein the node operates on a plurality of communication channels, the method further comprising:
    performing the sensing step for each of the plurality of communication channels; and
    identifying an operating channel of the plurality of communication channels for operation of the node by comparing the measured values.

18. A method as claimed in claim 1, wherein the time period is further determined using one or more out of band information.

19. A method as claimed in claim 1, wherein the at least one parameter comprises one or more parameters selected from a group comprising a noise floor, a quality of service, a network performance, and a neighboring node sensing metric.

20. A method of operating a node within a mobile cognitive adhoc network, the node operating on at least one communication channel, the method comprising:

establishing a wake up schedule based on a random start time and a node density representing a quantity of nodes of the mobile cognitive adhoc network;

performing sensing measurements of each of the communication channels when the node awakens based on the wake up schedule;

comparing the sensing measurement with a geolocation database predicted value of each of the communication channels measured;

increasing the rate of sensing measurements when the difference between the sensing measurement and the geolocation database predicted value exceeds a threshold;

reporting the sensing measurement to at least one other node when the difference between the sensing measurement and the geolocation database predicted value exceeds the threshold; and sleeping based on the wake up schedule.

21. A node within a mobile ad hoc cognitive radio network, the node comprising:

a spectral sensing module configured to:
sense at least one communication channel; and
measure a value of at least one parameter corresponding to the at least one communication channel;

a memory for storing a set of stored values of the at least one parameter; and a processor configured to:
compare the measured value of the at least one parameter with the set of stored values of the at least one parameter based on a geolocation database calculations to determine a change in the measured values, wherein the geolocation database calculations comprise computing geolocation database predicted values of incumbent signal strengths per unit location; and activate a sleep mode of the node for a time period, wherein the time period is determined using the change in the measured values.

22. The node as claimed in claim 21, wherein the processor is further configured to:

add a result of the geolocation database calculations to the set of stored values; and track a historical rate of change using the set of stored values.

23. The node as claimed in claim 21 further comprising:

a transceiver configured to transmit the measured value to at least one neighboring node in response to the change between the measured value and the geolocation database predicted values exceeding a threshold.

* * * * *